BALANCED PHASE DETECTING CIRCUITS

Filed July 18, 1955 2 Sheets-Sheet 1

INVENTOR.
ALBERT MACOVSKI
BY
[signature]
ATTORNEY

April 21, 1959 A. MACOVSKI 2,883,452

BALANCED PHASE DETECTING CIRCUITS

Filed July 18, 1955 2 Sheets-Sheet 2

INVENTOR.
ALBERT MACOVSKI
BY
ATTORNEY 2,883,452
Patented Apr. 21, 1959

2,883,452

BALANCED PHASE DETECTING CIRCUITS

Albert Macovski, Massapequa, N.Y., assignor to Radio Corporation of America, a corporation of Delaware Application July 18, 1955, Serial No. 522,443

21 Claims. (Cl. 178—5.4)

The invention relates to phase detecting circuits, and it particularly pertains to balanced circuits for use in controlling the frequency of color reference signal generating circuits of color television receivers.

In present color television practice the information for reproducing the transmitted image in full color is conveyed by means of a luminance signal, and modulations representative of a plurality of color difference information signals are included at different phases of a chrominance subcarrier of center frequency of approximately 3.58 mc. In order to demodulate this chrominance subcarrier in a color television receiver, a plurality of locally generated color reference signals of the same frequency as the chrominance subcarrier, each having a prescribed phase of the chrominance subcarrier, are each mixed with the chrominance subcarrier. Not only must the locally generated reference signals be maintained at the same frequency as the chrominance subcarrier but they must each be maintained in proper phase. In order that proper phasing of the locally generated color reference signals with the chrominance subcarrier may be made possible, a burst of unmodulated chrominance subcarrier frequency information called the color burst is transmitted during the blanking interval and after the horizontal synchronizing pulse. At the receiver a phase detecting circuit is used to determine the phase between the color burst and the locally generated color reference signal. In color television receivers the source of color reference signal is generally an oscillator operating under the control of a variable reactance tube circuit responsive to a direct potential obtained from the phase detecting circuit. The phase detecting circuit is usually gated to compare the phases of the oscillator output and the color burst only at the proper time interval.

While suitable phase detecting circuit arrangements for this purpose are known in the art, a phase detecting circuit according to the invention to be described possess the additional advantages of being insensitive to any nonsymmetrical amplitude characteristic of the color burst and remains balanced and therefore provides signal cancellation for interfering signals, provides a circuit wherein the gating of the phase detecting circuit proper is greatly simplified, and, in addition, the circuit provides twice the gain of the conventional circuit.

An object of the invention is to provide a balanced phase detecting circuit which is insensitive to any nonsymmetry of an applied signal, the phase relationship of which is to be determined with respect to another signal.

Another object of the invention is to obtain a greater gain from a balanced phase detecting circuit arrangement than is obtainable with the prior art arrangements.

A further object of the invention is to provide a balanced phase detecting circuit for a color television receiver which remains balanced for interfering signals.

According to the invention a direct current potential of magnitude and polarity in accordance with the direction of the phase deviation between a pair of voltage waves of substantially the same frequency is developed across a pair of series connected impedance devices, or resistance elements, by means of a pair of unilateral conducting devices, or diode elements, connected between the sources of the voltage waves and the series connected impedance devices. One unilateral conducting device is arranged to detect the instantaneous peak potentials of the two voltage waves in given phase relationship, and to produce current flow in one of the impedance devices proportional to the resultant peak potential of the two waves. The other unilateral conducting device is connected to detect the instantaneous peak potentials of the same two waves in antiphase relationship, or phase opposition, to produce current flow in the other impedance device proportional to the resultant peak potential of the two waves in antiphase relationship. The unilateral conducting devices are poled so that the difference between the two potentials developed across the impedance device is presented at the terminals of the series connected devices. By arranging the unilateral conducting devices as series circuit detectors relative to one voltage wave and as shunt circuit detectors to the other voltage wave, a very simple circuit arrangement is derived with maximum gain and no sensitivity to non-symmetrical signals.

In a color television receiver, for example, one of the voltage waves is derived from a band pass circuit conveying the chrominance signals and the color bursts to the color difference signal demodulating circuit. The other voltage wave is derived from the local oscillation generating circuit producing the color reference signal for the color difference signal demodulating circuit. The output, or control, potential of the phase detecting circuit according to the invention is applied to the control potential terminals of a variable reactance circuit which is coupled to the color phase reference signal generating circuit to control the frequency of the generating circuit in response to the applied direct potential. Over a small frequency deviation there is effected a change in phase, whereby the output color phase reference signal is maintained in phase with the received burst of color phase reference signal transmitted with the composite television signal wave.

In order that the practical aspects of the invention may be fully appreciated and readily applied, express embodiments of the invention, given by way of examples only, are described hereinafter with reference to the accompanying drawing in which.

Figure 1:
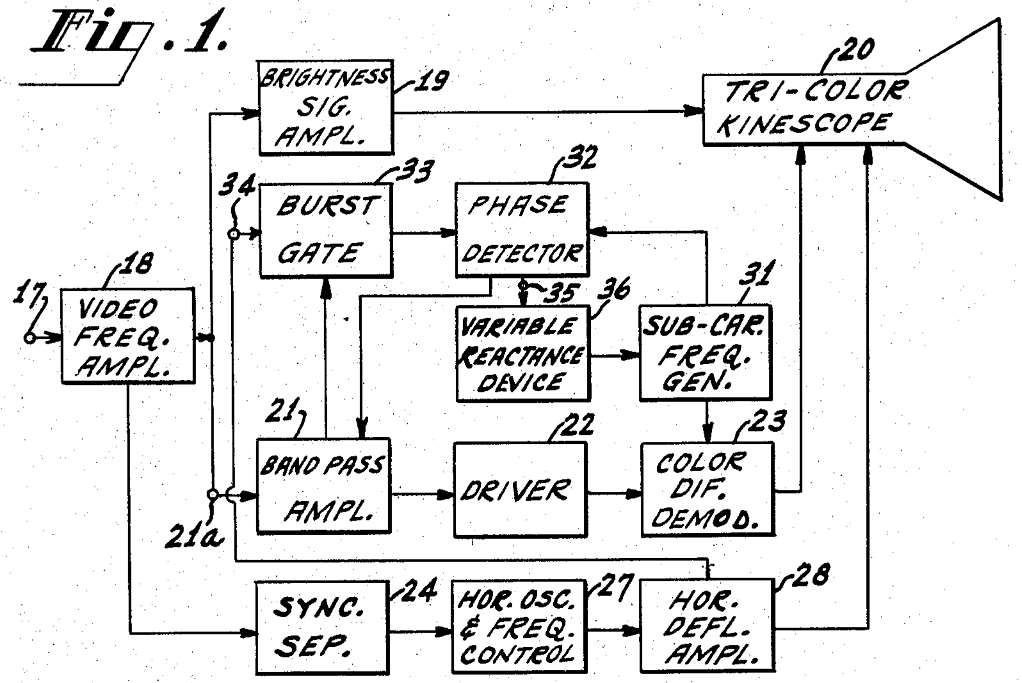
Fig. 1 is a functional diagram of portions of a color television receiver incorporating a phase detecting circuit according to the invention.

A functional diagram of portions of a color television receiver incorporating the invention is shown in Fig. 1. Such a color television signal receiver, for example, may otherwise comprise circuits which might be entirely conventional and are mentioned in order to provide a setting for the invention. In such a receiver, color television signals appearing at an antenna are applied to a radio frequency wave amplifying circuit and the output therefrom is applied along with a wave obtained from a local beat oscillating generating circuit to a frequency changing circuit. The output of the frequency changing circuit is applied, to a picture intermediated frequency (I.-F.) amplifying circuit, which may be an individual picture I.-F. amplifying circuit or one amplifying both picture and sound signals. A demodulating circuit is coupled to the picture I.-F. amplifying circuit for deriving a video frequency wave from the television signals. The detected composite video signal wave is amplified in a video frequency (V-F) amplifying circuit 18 appearing at input terminals 17. Sound signals are derived from the above mentioned circuits, demodulated, amplified and applied to a transducer, usually a speaker. The luminance signal portion of the composite color information is separated into two channels: the luminance channel comprising a brightness signal amplifying circuit 19 connected between the video frequency amplifying circuit 18 and a tri-colored image reproducing device or kinescope 20 and the chrominance channel comprising a bandpass amplifying circuit 21 coupled to the video frequency amplifying circuit 18, a demodulator driving circuit 22, and a color difference signal demodulating circuit 23 connected between the bandpass amplifier 21 and the kinescope 20. The output of the video amplifying circuit is also applied to a synchronizing pulse separating circuit 24 to separate the synchronizing pulses from the image information and to separate the vertical synchronizing pulses from the horizontal. The separated vertical synchronizing pulses are applied to a vertical deflection wave generating circuit (not shown) and the horizontal synchronizing pulses are applied to a horizontal deflection wave generating circuit 27. The horizontal deflection waves are amplified in a horizontal deflection wave amplifying circuit 28 and thereafter applied along with the vertical deflection waves to the deflection system of the kinescope 20. An automatic gain control circuit may be employed in the conventional manner to control the gain of desired ones of the circuits previously mentioned. Usually the R.-F. and I.-F. circuits are at least so controlled. High voltage and focus voltage generating circuits may be coupled to the horizontal deflection wave amplifying circuit 28 for generating high voltage and focus voltage 40 for the kinescope 20. In addition intercoupled circuits for generating convergence waves for dynamic convergence of the individual beams of a multi-gun kinescope are usually provided and connected between the horizontal deflection wave amplifying circuit 28 and the vertical deflection wave amplifying circuits and the kinescope 20. In order to properly demodulate the chrominance subcarrier, a color reference signal generating circuit 31 providing an output of chrominance subcarrier frequency is coupled to the color difference signal demodulating circuit 23. Since the proper hue of the colors will be reproduced on a tri-colored kinescope 20 only when the locally generated color reference signal from the generating circuit 31 is in phase with the color burst transmitted as part of the composite color signal. The output of the color reference signal generating circuit 31 is applied to a phase detecting circuit 32 in which the color reference signal is compared in phase with the color burst. This burst is applied to the phase detecting circuit 32 by means of a gating circuit 33 coupled to the bandpass amplifying circuit 21 and gated in response to pulses at the gating input pulse terminals 34 obtained from the horizontal deflection wave amplifying circuit 28. The output of the phase detecting circuit 32 is a direct potential presented at terminals 35 which is proportional to the difference in phase between the color burst and the locally generated color reference signal and of polarity indicative of the direction of the phase deviation. This direct control potential is applied to a variable reactance device 36 coupled to the local color reference signal generating circuit 31 denoted in the figure as "Sub-Car. Freq. Gen.," to control the frequency and phase thereof. Direct potential may also be obtained from the phase detecting circuit 32 proportional to the strength of the color burst and applied to the input circuit of the bandpass amplifying circuit as an automatic chroma controlling (a-c-c) voltage. In addition direct voltage indicating the presence of the color burst in the composite TV signal may be used to operate a color killer circuit to effectively disconnect the bandpass amplifying circuit 21, or perform a similarly effective function, when a monochrome television signal only is received.

Figure 2:
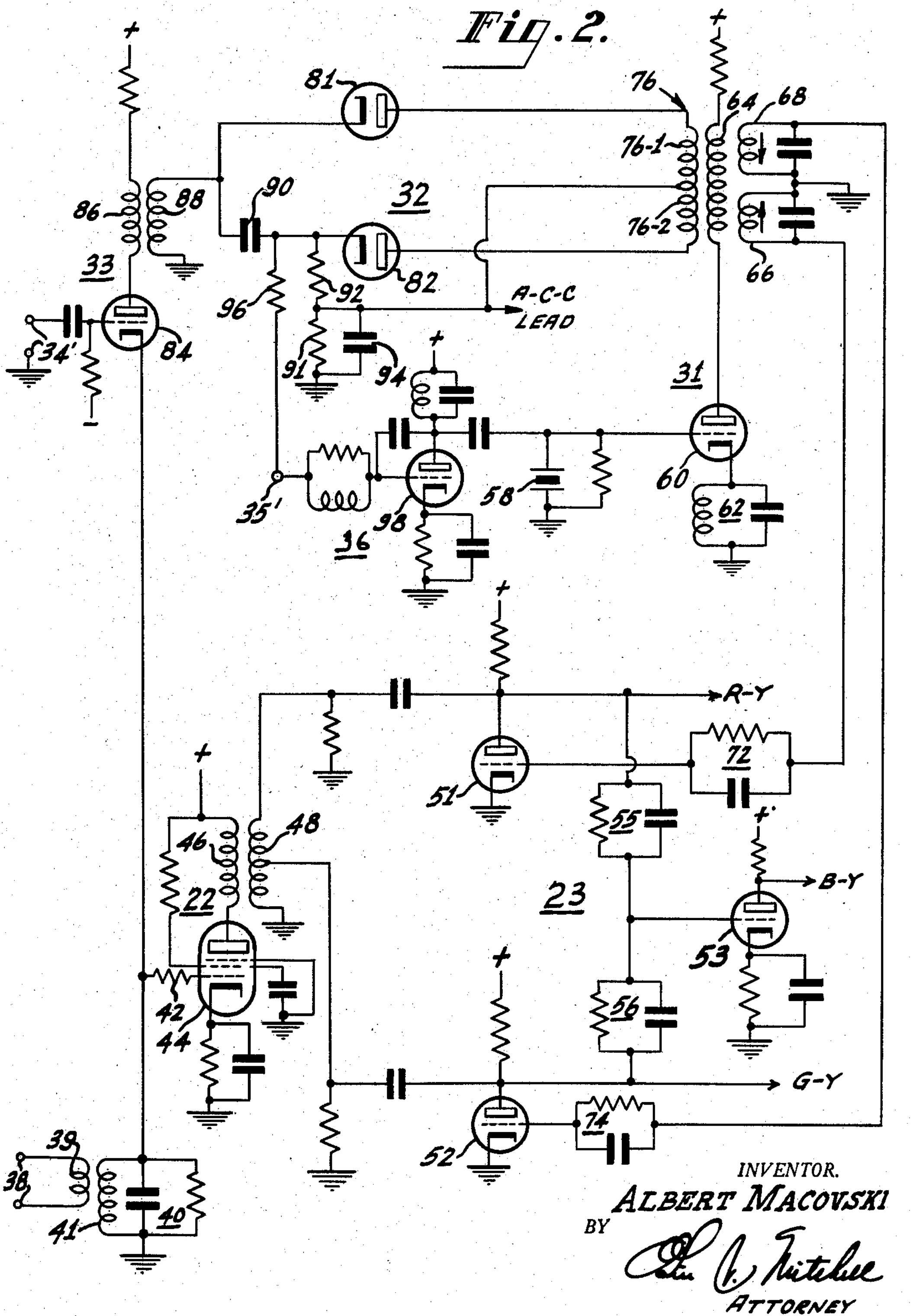
Fig. 2 is a schematic diagram of an embodiment of the invention for performing some of the functions outlined in Fig. 1.

A schematic diagram of a circuit arrangement for performing some of the functions outlined in Fig. 1 is shown in Fig. 2. A composite color television signal as modified by the bandpass amplifying circuit 21 is applied at a pair of input terminals 38 of a link winding 39 and induced into an oscillatory circuit 40. The wave energy in the oscillatory circuit 40, comprising the color burst and the chrominance signal, is applied through a series resistor 42 to the grid of a demodulator driving tube 44 of a known demodulator circuit. The amplified chrominance signal appearing in the primary winding 46 are induced in the secondary winding 48 of the chrominance signal output transformer. The chrominance signals are applied to the anodes of synchronous demodulator tubes 51, 52; color difference signals developed at the anodes of the demodulator tubes 51 and 52 are applied and to the grid of a color difference signal amplifying tube 53 through phase shifting resistance-capacitance networks 55, 56 to produce a third color difference signal at the anode of tube 53. A quartz crystal 58 resonant at the color burst frequency (approximately 3.58 mc. in accordance with current color television standards established by the Federal Communications Commission) is connected in the grid circuit of an oscillator tube 60. A circuit 62 tuned to the crystal frequency is connected in the cathode lead of the oscillator tube 60 and a primary winding 64 is connected in the anode lead. A pair of secondary windings 66, 68 are coupled to the primary winding 64 and are connected through resistance-capacitance phase shifting networks 72, 74 to the grids of the color difference demodulating tubes 51, 52 with the waves differing by 63.6° in phase. By means of this known demodulating circuit red, and green color difference signals are obtained at the anodes of the demodulating circuit tubes 51 and 52 and a blue color difference signal is developed at the anode of tube 53 for application to the kinescope 20 along with the brightness signal wherein the four component signals are mixed to obtain the proper electron beam intensity modulating signals for reproducing the image in full color. Of course, other known demodulator circuits may be used with the invention if desired.

To insure generation of the color phase reference signal in the proper phase relationship to the transmitted color burst a substantially center tapped secondary winding 76 is inductively coupled to the primary winding 64 to produce voltages of locally generated color reference signal frequency in phase opposition with respect to each other. The terminals of the secondary winding 76 are connected to the anode electrodes of a pair of unilateral conducting devices shown as diode elements 81, 82 of the phase detecting circuit 32. The transmitted color burst appearing in the oscillatory circuit 40 is gated by means of a gating tube 84 in response to gating pulses obtained during the flyback interval of the horizontal beam deflection wave cycle appearing at the gating pulse input terminals 34' and applied to the grid of the gating tube 84. The color bursts appearing in the primary winding 86 of a burst take-off transformer in the anode lead of the gating tube 84 are induced in the secondary winding 88 and presented between a point of fixed reference potential, shown as ground, and the cathode electrodes of the detector diode elements 81, 82. A storage capacitor 90 is interposed in the cathode lead of the diode element 82 to store energy proportional to the peak potential rectified by diode element 82 in a shunt detector arrangement. A pair of impedance devices, shown as resistance elements 91 and 92, are connected in series between the cathode electrode of the diode element 82 and the point of reference potential, or ground. A capacitor 94 is shunted across the load resistance element 91 for the purpose of storing energy proportional to the peak potential rectified by the diode element 81 in a series detector arrangement and the center tap of the secondary winding 76 is connected to the junction of the load resistance elements 91, 92. The circuit shown operates to measure the instantaneous peak potentials of one voltage wave, derived from the color phase reference signal burst across the burst transformer secondary winding 88 with another voltage wave derived across one portion 76–1 of the oscillator output transformer winding 76 to produce current flow in the load resistance element 91 proportional to the instantaneous peak values of the voltages. The other diode element 82 serves as a peak detector for the one voltage wave derived in the burst take-off transformer secondary winding 88 and the antiphase version of the other voltage wave obtained from the other portion 76–2 of the oscillator output transformer secondary winding 76 to produce current flow through the other load resistance element 92 proportional to the resultant of the instantaneous peak potentials of the two waves. The circuit is arranged so that the difference in potential across the load resistance elements 91, 92 in series is applied through a series resistor 96 to the output terminals 35′ for further application to the grid of the reactance tube 98 coupled to the oscillator tube 60. In practice the oscillator tube 60 and the reactance tube 98 are preferably pentode tubes but are shown as triodes in the interest of simplification. The potential across one of the load resistance elements 91 will be proportional to the amplitude of the received color burst and therefore may be applied as an automatic chroma controlling (a-c-c) voltage to control the gain of a chroma amplifying tube circuit. This voltage may also be used as a control voltage for operating a color killer since it obtains a substantial value only upon reception of the color phase reference signal burst. Since the burst is applied to both cathode electrodes the circuit is insensitive to non-symmetry of the unbalanced or single-ended, burst voltage and remains balanced for all interfering or non-synchronous signals. This obviates the use of a balancing potentiometer and the necessity for frequent balancing of the circuit, which feature is of no little importance. Since the detected output voltages of the two diode elements are in effect algebraically added rather than vectorially added as in the usual matrixing circuit, the phase detecting circuit according to the invention has greater gain than the conventional circuit arrangements. Furthermore the sizes of the load resistance elements 91, 92 are independent of each other since both diode elements operate as peak detectors. The increase gain obtained with the circuit according to the invention can be used either for increasing the stability of reactance tube operation or providing increased pull in range with decreased static phase error. In addition the circuit shown in Fig. 2 may be more simply gated as will be shown in connection with another embodiment of the invention illustrated in Fig. 3. Thus increased gain, stability and balance is achieved with the phase detecting circuit according to the invention without using any component parts in addition to those used in conventional phase detector.

Figures 3, 4:
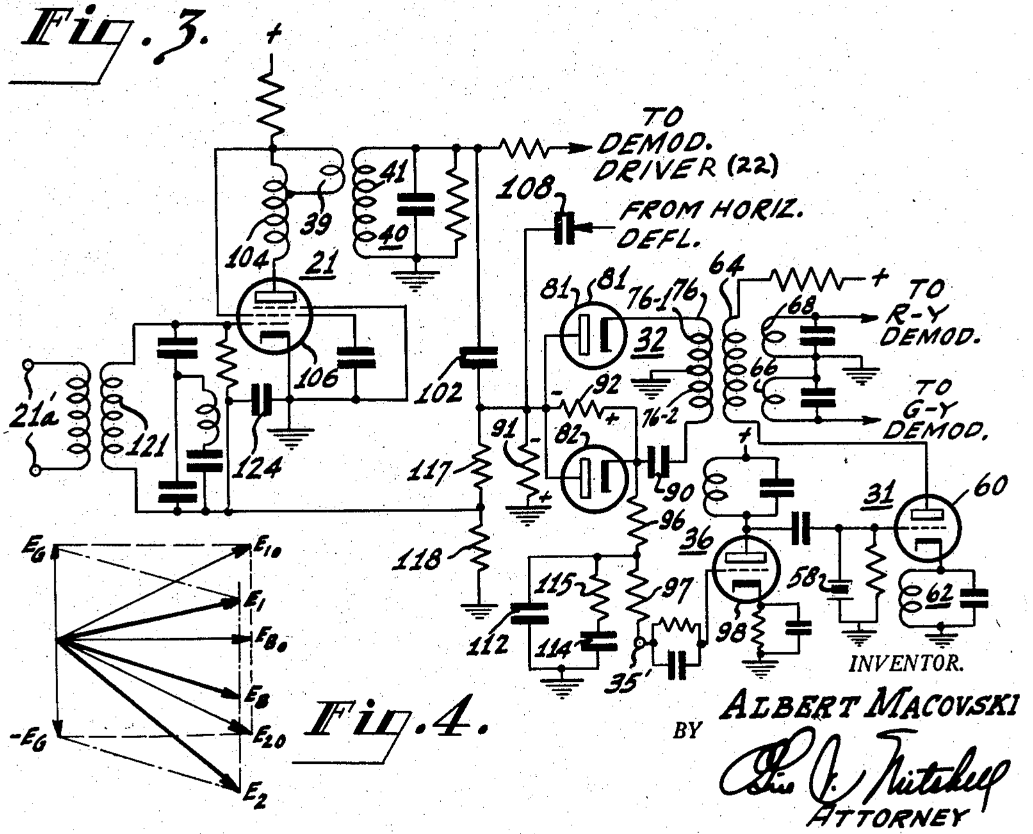
Fig. 3 is a schematic diagram of another phase detecting circuit according to the invention.
Fig. 4 is a vectorial representation of the operation of the phase detecting circuits according to the invention.

Another embodiment of the invention is shown in Fig. 3, wherein the terminals of the oscillator output transformer secondary winding 76 are coupled to the cathode electrodes of the diode elements 81, 82. The charging capacitor 90 is interposed between the winding 76 and the cathode of the diode element 82 to store energy proportional to the peak potential across the diode. The color phase reference signal burst is derived from the oscillatory circuit 40 and applied by means of a charging capacitor 102 between the anode electrodes of both diode elements, 81, 82 and a point of reference potential, shown as ground. Color difference modulated wave energy for energizing the link winding 39 is obtained from an output auto-transformer 104 connected in the anode lead of a band-pass amplifying tube 106. The phase detecting circuit 32 is gated as shown in Fig. 3 by a flyback pulse obtained from the output transformer of a horizontal deflection wave amplifying circuit, for example, applied between ground and the anodes of the diode elements 81, 82 by means of a pulse coupling capacitor 108. It should be borne in mind, that according to the invention, either the circuit arrangement shown in Fig. 2 or that shown in Fig. 3 may be gated in the same manner with equal efficiency. As with the arrangement of Fig. 2 the direct potential across the series resistance elements 91, 92 is applied through series resistance elements 96, 97 to the terminals 35′ coupled to the grid of the reactance tube 98. An anti-hunt filter network comprising a shunt capacitor 112 and a series circuit comprising a capacitor 114 and a resistor 115 connected in parallel between the series resistance elements 96, 97 is shown. Such a network is generally used with the circuit according to the invention as well as with conventional circuits.

The phase detecting circuit according to the invention may be used to provide a direct potential for controlling a color killer circuit or for automatic chroma control. By means of a voltage divider comprising two resistors 117 and 118 the potential across one of the series load resistance elements 91 is divided and applied through the secondary winding 121 of the bandpass input transformer to the control grid of the chrominance subcarrier bandpass amplifying tube 106 in a manner analogous to automatic gain control for I.-F. tubes. A bypass capacitor 124 is used both for the normal A.-C. grounding for the grid circuit and as a filter for the a-c-c potential. In some instances perhaps, additional filtering of the a-c-c potential may be required, but such filtering may be accomplished in known manner. The a-c-c potential may be applied to other automatic chroma amplifying circuitry known to the art, the arrangement shown being but one example of such application.

To aid in the design of a practical phase detecting circuit according to the invention the rectified peak current flow will be traced for the circuit arrangement of Fig. 3, bearing in mind that the arrangement shown in Fig. 2 operates in similar fashion. The components of the phase detecting circuit 32 as shown in Fig. 3 are arranged to form two shunt detecting circuits. One of these shunt peak detecting circuits charges a capacitor to the peak potential of the vector sum of the color burst and the color reference signal voltages of given phase relationship and the other detecting circuit charges other capacitors with the peak voltage of the vector sum of the two signals in phase opposition. The two resultant peak potentials are now developed across the load resistance elements 91, 92 in opposition to produce a potential across both resistance elements which is proportional to the difference in the two vector sums. The charging capacitor 102 is charged with the peak potential with a color burst across the winding 41 and the reference signal across the winding portion 76–1 developing a negative potential across the load resistance element 91 from the current flowing through the diode element 81. Similarly the capacitor 90 is charged with the peak potential of the burst and reference signal appearing across the other winding portion 76–2 across the diode element 82 developing positive potential across the load resistance element 92. Since the amplitude of the reference signal is fixed, the output potential across the series connected load resistance elements 91, 92 is dependent on the phase difference between the color burst and color reference signals. The operation is indicated schematically by the vector diagram of Fig. 4. The opposite phases of the constant amplitude color reference signals are represented by the light arrows $E_G$ and $-E_G$. The in phase vector of the color burst is represented by the light arrow $E_{B_0}$ while the general case is indicated by the heavy arrow $E_B$. The resultant voltages for the in phase case are shown by the light arrows $E_{1_0}$ and $E_{2_0}$ which are of equal value and hence the output control potential developed as a result thereof will be zero. The general case is indicated by the heavy arrows $E_1$ and $E_2$ which are of unequal value, therefore producing the control potential of finite value and sign depending on which of the two vectors is the larger. With the gating arrangement as shown in Fig. 3 the charging capacitors 102 and 90 will be charged to the peak potentials plus the voltage of the gating pulse so that the relative output potential remains the same and additional bias is placed on each diode element 81, 82 to maintain the diode elements at cut-off during the remainder of the cycle.

As a practical matter all balanced phase detectors operate better if one of the waves is of appreciably greater amplitude than the other. A ratio of two to one provides very good operation. In the arrangement shown, excellent results were found when the burst amplitude was approximately twice as great as the amplitude of the reference signal.

Those skilled in the art will readily determine the values of the components for application of the invention to the particular case at hand, however, the values listed below which were used in a working embodiment of the invention as illustrated in Figs. 2 and 3 are suggested as a guide.

| Ref. No. | Component | Type or Value |
|---|---|---|
| 44 | Demodulator Driving Tube | 6AG7. |
| 51, 52 | Demodulating tubes | 12BH7. |
| 53 | Color difference amplifier | 1/s. 6AZ8. |
| 60 | Oscillator tube | 1/s. 6AZ8. |
| 81, 82 | Diodes | 6AL5. |
| 90 | Charging capacitor | 0.001 mf. |
| 91, 92 | Load resistors | 1 Mo. |
| 94 | Capacitor | 0.001 mf. |
| 96 | Series resistor | 10 ko. |
| 97 | Series resistor | 5 ko. |
| 98 | Reactance tube | 1/s. 6AN8. |
| 102 | Coupling capacitor | 0.001 mf. |
| 106 | Band pass amplifier | 1/s. 6AZ8. |
| 108 | Pulse coupling capacitor | 0.047 mf. |
| 112 | Anti-hunt capacitor | 0.01 mf. |
| 114 | Anti-hunt capacitor | 0.22 mf. |
| 115 | Anti-hunt resistor | 15 ko. |
| 118 | Voltage divider resistor | 560 ko. |
| 124 | Bypass capacitor | 0.01 mf. |

The power supply developed a potential of approximately 300 volts positive between the points marked with a plus sign (+) and ground and approximately 20 volts negative between those points marked with a minus sign (−) and ground.

The invention claimed is:

1. A balanced phase detecting circuit including, a pair of impedance devices connected in series, a pair of unilateral conducting devices having cathode and anode electrodes, a tapped inductance winding having the terminals connected to apply one voltage wave of prescribed frequency and phase between the anode electrodes of said unilateral conducting devices and a point of neutral potential, a connection between the tap on said inductance winding and the junction between said impedance devices, a capacitor connected between the cathodes of said unilateral conducting devices, means to apply a voltage wave of substantially the same frequency as that of said one voltage wave between said point of neutral potential and the junction between the cathode of one of said unilateral conducting devices and said capacitor, means connecting one terminal of one of said impedance devices to said point of neutral potential, and means connecting the remaining terminal of the other of said impedance devices to the cathode electrode of the other of said unilateral conducting devices, thereby to establish a potential across said series connected impedance devices proportional to the phase difference between said voltage waves.

2. A balanced phase detecting circuit including, a pair of impedance devices connected in series, a pair of unilateral conducting devices having cathode and anode electrodes, a connection between said anode electrodes and the junction between said impedance devices, a tapped inductance winding having the terminals connected to apply one voltage wave of prescribed frequency between the cathode and electrodes of said unilateral conducting devices and a point of neutral potential in phase-antiphase relationship, a capacitor interposed in the connections between said winding and one of said cathode electrodes, means to apply a voltage wave of substantially the same frequency as that of said one voltage wave between said anode electrodes and said point of neutral potential, means connecting one terminal of one of said impedance devices to said point of neutral potential, and means connecting the remaining terminal of the other of said impedance devices to the cathode electrode of said one unilateral conducting device, thereby to establish a potential across said series connected impedance devices proportional to the phase difference between said voltage waves.

3. A phase detecting circuit including, a pair of impedance devices connected in series, a pair of dual-electrode unilateral conducting devices, means including a first storage device to apply a pair of voltage waves of substantially the same frequency across one of said unilateral conducting devices and one of said impedance devices, and means including a second storage device to apply said pair of voltage waves with one of said waves in phase opposition to the same wave as applied to said one impedance device through the other unilateral conducting device and across the other impedance device, utilization means having input terminals, and means for coupling said input terminals across said series connected impedance devices whereby said utilization means is made responsive to direct potential proportional to the phase difference between said waves established across said series connected impedance devices.

4. A phase detecting circuit including, a pair of resistance elements connected in series, a pair of diode elements each having an anode and a cathode, means to apply a pair of voltage waves of substantially the same frequency between the cathode and anode electrodes of one of said diode elements and across one of said resistance elements, and means to apply said pair of voltage waves with one of said waves reversed in phase between the anode and cathode electrodes of the other diode element and across the other resistance element, means for connecting one end terminal of the series combination formed by said series connected resistance elements to a point of reference potential, a phase difference indicative signal utilization means coupled to the other end terminal of said series combination and thereby responsive to the net potential established across said series combination.

5. A phase detecting circuit including, a pair of resistance elements connected in series, a pair of diode elements each having an anode and a cathode, means to apply a pair of voltage waves of substantially the same frequency between the anode and cathode electrodes of one of said diode elements and across one of said resistance elements, and means to apply said pair of voltage waves with one of said waves reversed in phase between the anode and cathode electrodes of the other diode element and across the other resistance element, the anode electrodes of said diode elements being connected to the junction between said resistance elements, and means for utilizing the direct potential proportional to the phase difference between said waves established across the series combination formed by said series connected resistance elements.

6. A color television receiving circuit arrangement including, a circuit across which a wave having at least a burst of sine wave of given frequency is derived from the received composite color television signal, an oscillator circuit having a winding in which a wave of said given frequency is developed, a variable reactance circuit coupled to said oscillator circuit to control the output frequency and phase thereof in response to direct potential proportional to the phase and frequency difference between said developed and said derived waves and which is applied at control potential terminals included therein, a tapped inductance winding having a pair of terminals coupled to said oscillator winding to induce in said pair of terminals two voltage waves in phase opposition, a pair of diode elements having like electrodes coupled to said pair of terminals of said inductance winding, connections between said wave deriving circuit and the other electrodes of said diode elements, a pair of resistance elements connected in series across said variable reactance circuit control potential terminals, a connection between the junction of said resistance elements and like electrodes of said diode elements and one of said terminals of said variable reactance circuit, and a coupling element between the other terminal of said variable reactance circuit and the tap of said inductance winding.

7. A color television receiving circuit arrangement including, a circuit across which a wave having at least a burst of sine wave of given frequency is derived from the received composite color television signal, an oscillator circuit having a winding in which a wave of said given frequency is developed, a variable reactance circuit coupled to said oscillator circuit to control the output frequency and phase thereof in response to a direct potential which is proportional to the phase and frequency difference between said developed and said derived waves and which is applied at control potential terminals, a tapped inductance winding having a pair of terminals and coupled to said oscillator winding to induce at said pair of terminals two voltage waves in phase opposition, a pair of diode elements having the anode electrodes coupled to the terminals of said inductance winding, a capacitor interconnecting the cathode electrodes of said diode elements, a connection between said wave deriving circuit and the junction between said capacitor and the cathode of one of said diode elements, a pair of resistance elements connected in series across said variable reactance circuit control potential terminals, a connection between the junction of said resistance elements and the tap of said inductance winding, a connection between one of said terminals of said series connected resistance elements, and the cathode electrode of said one diode element and a connection between the other terminal of said series connected resistance elements and the other terminal of said wave deriving circuit.

8. A color television receiving circuit arrangement including, a circuit in which a wave having at least a burst of sine wave of given frequency is derived from the received composite color television signal, an oscillator circuit having a winding in which a wave of said given frequency is developed, a variable reactance circuit coupled to said oscillator circuit to control the output frequency and phase thereof in response to direct potential which is proportional to the phase and frequency difference between said developed and said derived waves and which is applied at control potential terminals, a tapped inductance winding having a pair of terminals and coupled to said oscillator winding to induce at said pair of terminals two voltage waves in phase opposition, a pair of diode elements having anode and cathode electrodes, a capacitor intercoupling one of said cathode electrodes and one of the terminals of said inductance winding, a connection between the other cathode electrode and the other terminal of said winding, connections between said wave deriving circuit and the anode electrodes of said diode elements, a pair of resistance elements connected in series across said variable reactance circuit control potential terminals, a connection between the junction of said resistance elements and the anode electrodes of said diode elements, a connection between one of said terminals of said series connected resistance elements and said one cathode, and a connection between the other terminal of said series connected resistance elements and the tap of said inductance winding.

9. A color television receiving circuit arrangement including, a circuit in which a wave having at least a burst of sine wave of given frequency is derived from the received composite color television signal, an oscillator circuit having a winding in which a wave of said given frequency is developed, a variable reactance circuit having control terminals and coupled to said oscillator circuit to control the output frequency and phase thereof in response to a direct potential which is proportional to the phase and frequency difference between said developed and said derived waves and which is applied at said control potential terminals, a tapped inductance winding having different end terminals and coupled to said oscillator winding to induce at said end terminals two voltage waves in phase opposition, a pair of diode elements having the anode electrodes connected together and the cathode of one of said diode elements connected to one terminal of said inductance winding, a resistance element connected between said anode electrodes and the tap on said inductance winding, a capacitor connected between the remaining terminal of said inductance winding and the cathode of the other diode element, another resistance element connected between the anode and cathode electrodes of said other diode element, a connection between said wave deriving circuit and said anode electrodes, and connections from the terminals of said resistance elements remote from said anode electrodes to the control potential terminals of said reactance circuit.

10. A color television receiving circuit arrangement including, an amplifying circuit comprising an electron discharge device having an input and an output from which a wave having at least a burst of sine wave of given frequency is derived from the received composite color television signal, an oscillator circuit having a winding in which a wave of said given frequency is developed, a variable reactance circuit having control terminals and coupled to said oscillator circuit to control the output frequency and phase thereof in response to direct potential proportional to the phase and frequency difference between said developed and said derived waves applied at said control potential terminals, a tapped inductance winding having end terminals and coupled to said oscillator winding to induce at said end terminals two voltage waves in phase opposition, a pair of diode elements having like electrodes coupled to the end terminals of said inductance winding, connections including a first capacitor between said wave amplifying circuit and the other electrodes of said diode elements, a pair of resistance elements connected in series across said variable reactance circuit control potential terminals, connections including a second capacitor between the junction of said resistance elements and like electrodes of said diode elements and one of said terminals of said variable reactance circuit, a coupling element between the other terminal of said variable reactance circuit and the tap of said inductance winding, and an impedance circuit coupled from the junction between said resistance elements and the input of said amplifying circuit.

11. A color television receiving circuit arrangement including, a wave amplifying circuit comprising an electron discharge device having an anode and a grid from which a wave having at least a burst of sine wave of given frequency is derived from the received composite color television signal, an oscillator circuit having a winding in which a wave of said given frequency is developed, a variable reactance circuit coupled to said oscillator circuit to control the output frequency and phase thereof in response to direct potential which is proportional to the phase and frequency difference between said developed and said derived waves and which is applied at control potential terminals, a tapped inductance winding having a pair of terminals and coupled to said oscillator winding to induce at each of said pair of end terminals a different one of two voltage waves in phase opposition, a pair of diode elements having anode and cathode electrodes and having the anode electrode connected together and the cathode of one of said diode elements connected to one terminal of said inductance winding, a resistance element connected between said anode electrodes and the tap on said inductance winding, a capacitor connected between the remaining terminal of said inductance winding and the cathode of the other diode element, another resistance element connected between the anode and cathode electrodes of said other diode element, a connection including a second capacitor between said wave deriving circuit and said anode electrodes, connections from the terminals of said resistance elements remote from said anode electrodes to the control potential terminals of said reactance circuit, and an impedance circuit coupled from said anode electrodes to the grid of said electron discharge device.

12. In a color television receiver adapted to receive color synchronizing bursts having prescribed frequency and phase, a phase detector circuit comprising in combination: a first and second plurality of inter-connected impedances having a common junction terminal, a first and second unilateral conducting device having first like electrodes and second like electrodes, said first like electrodes connected to said common junction terminal, oscillator means to develop a voltage wave having substantially said prescribed frequency and having a phase relationship relative to said prescribed phase to be determined, means coupled to said oscillator to apply one polarity of said voltage wave to said second plurality of inter-connected impedance devices and therefrom to said second electrode of one of said unilateral devices, means coupled to said oscillator to apply a second and different polarity of said voltage wave to said second electrode of the other of said unilateral devices, and means to apply said bursts to said first plurality of interconnected impedance devices thereby to develop a voltage across said impedance proportional to the difference in phase between said voltage waves and said bursts.

13. In combination: a first circuit to provide intermittent bursts of an alternating current wave having prescribed frequency and phase, a second circuit to provide a separately generated alternating current wave having substantially said prescribed frequency and having a phase bearing a phase relationship to said prescribed phase, an inductance means coupled to said second circuit, said inductance means having a first terminal at which is developed said alternating current wave having a phase relationship to said prescribed phase and a second terminal at which an opposite phase of said wave developed at said first terminal is produced, a first peak detector means including a first rectifier means and coupled between said first circuit and said first terminal to rectify said bursts and said first terminal wave in said first rectifier means and to develop therefrom a first signal representing the peak amplitude of said bursts combined with said first terminal wave, a second peak detector means including a second rectifier means and coupled between said first peak detector means and said second terminal and operative independent of said rectification in said first rectifier means to rectify said bursts and said second terminal wave in said second rectifier means and to develop therefrom a second signal independent of said first signal and representing the peak amplitude of said bursts combined with said second terminal wave, means coupled to said first and second peak detector means to algebraically add said first and second signals to form a third signal representative of the phase relationship between said bursts and said first terminal wave.

14. In combination: a first circuit to provide intermittent color synchronizing bursts comprising a prescribed number of cycles of an alternating current wave having prescribed frequency and phase and occurring during retrace intervals of a color television signal, a second circuit to provide a separately generated alternating current wave having substantially said prescribed frequency and a phase having a prescribed relationship relative to said burst phase and to also provide an opposite phase of said generated wave, a first peak detector means coupled to said first and second circuits to develop a first voltage representative of the peak amplitude of said bursts in combination with said generated wave, a second peak detector means coupled to said first and second circuits to develop a second voltage representative of the peak amplitude of said bursts in combination with said opposite phase of said generated wave, said first and second peak detector means in circuit and operative to provide an algebraic combination of said first and second voltages to provide a third voltage indicative of said prescribed phase relationship between said bursts and said generated alternating current wave responsive to a control potential of prescribed amplitude applied thereto during said retrace intervals, and pulser means coupled to said first and second peak detector means and operative to apply a pulse occurring in coincidence with and having the duration interval of said bursts and having said prescribed amplitude to said first and second peak detector means during said retrace interval.

15. In combination: a first circuit to provide intermittent color synchronizing bursts of an alternating current wave having prescribed frequency and phase, a second circuit to provide a separately generated alternating current wave having substantially said prescribed frequency and a phase bearing a prescribed phase relationship relative to said burst phase and also to provide an opposite phase of said generated wave, a first peak detector means having a first output impedance and coupled to said first and second circuits to develop a first voltage indicative of the peak amplitude of said burst in combination with said generated wave across said first output impedance, a second peak detector means having a second output impedance and coupled to said first and second circuits to develop a second voltage indicative of the peak amplitude of said bursts in combination with said opposite phase of said generated wave across said second output impedance, an output terminal, a fixed potential point, said first and second peak detector means in circuit to connect said first and second output impedances in series between said output terminal and said fixed potential point to provide an algebraic combination of said first and second voltages to provide a third voltage indicative of said prescribed phase relationship between said generated alternating current wave and said bursts at said output terminal.

16. In combination: a first circuit to provide intermittent color synchronizing bursts of an alternating current wave having prescribed frequency and phase, a second circuit to provide a separately generated alternating current wave having substantially said prescribed frequency and having a phase bearing a phase relationship to said prescribed phase, an inductance means coupled to said second circuit and including a first terminal at which said alternating current wave is developed and a second terminal at which an opposite phase of said wave developed at said first terminal is produced, a first and second rectifier means, said first means including a first impedance and coupled to said first circuit and to said first terminal to apply said bursts and said alternating current wave to said first rectifier means to cause rectification of said bursts and said alternating current wave and to develop therefrom a first signal representative of the peak amplitude of said bursts combined with said alternating current wave across said first impedance, second means including a second impedance nonresponsive to said rectification in said first rectifying means and coupled to said first circuit and to second terminal to apply said bursts and said opposite-phase alternating current wave to said second rectifying means to cause rectification of said bursts and said opposite-phase alternating current wave and to develop therefrom a second signal representative of the peak amplitude of said bursts combined with said opposite-phase alternating current wave across said second impedance, said first and second impedances operatively connected in circuit to algebraically combine said first and second signals to thereby develop a third signal having a magnitude indicative of said phase relationship between said bursts and said alternating current wave.

17. In combination: a first circuit to provide intermittent color synchronizing bursts of an alternating current wave having prescribed frequency and phase, a second circuit to provide a separately generated alternating current wave having substantially said prescribed frequency and having a phase bearing a phase relationship to said prescribed phase, an inductance means coupled to said second circuit and including a first terminal at which said alternating current wave is developed and a second terminal at which an opposite phase of said wave developed at said first terminal is produced, a first and second rectifier means, first means coupled to said first circuit and to said first terminal to apply said bursts and said alternating current wave to said first rectifier means to cause rectification of said bursts and said alternating current wave and to develop therefrom a first signal representative of the peak amplitude of said bursts combined with said alternating current wave, second means coupled to said first circuit and to said second terminal to apply said bursts and said opposite-phase alternating current wave to said second rectifying means to cause rectification of said bursts and said opposite-phase alternating current wave and to develop therefrom a second signal independent of said rectification in said first rectifying means and representative of the peak amplitude of said bursts combined with said opposite-phase alternating current wave, said first and second applying means operatively connected in circuit to algebraically combine said first and second signals to develop a third signal having a magnitude indicative of said phase relationship between said bursts and said alternating current wave, means coupled to said first and second applying means to develop a fourth voltage representative of at least the peak amplitude of said bursts, a signal amplifier circuit having an input and output circuit and an amplification control circuit, the amplification of said signal amplifier circuit capable of being controlled by a control voltage applied to said amplification control circuit, and means to apply said fourth voltage to said amplification control circuit.

18. In a color television receiver including a local color reference signal generator, and means for deriving from received color television signals a color synchronizing signal comprising periodic bursts of oscillations of reference frequency and phase, apparatus comprising the combination of a first load impedance, a second load impedance, a control voltage output terminal, means for connecting said first and second load impedances in series between said control voltage output terminal and a point of reference potential, first rectifying means coupled to said color reference signal generator and to said color synchronizing signal deriving means for developing across said first load impedance a first unidirectional potential proportional to the peak amplitude of the combination of said color synchronizing signal and a first color reference signal output of said generator, second rectifying means coupled to said color reference signal generator and to said color synchronizing signal deriving means for developing across said second load impedance a second unidirectional potential proportional to the peak amplitude of the combination of said color synchronizing signal and a second color reference signal output of said generator substantially differing in phase from said first color reference signal output, and a phase control means coupled to said generator and to said control voltage output terminal for controlling said generator in phase in accordance with the control voltage developed at said terminal and comprising the algebraic sum of said first and second unidirectional potentials.

19. In a color television receiver including a local color reference signal generator, and means for deriving from received color television signals a color synchronizing signal comprising periodic bursts of oscillations of reference frequency and phase, apparatus comprising the combination of a first load impedance, a second load impedance, a control voltage output terminal, means for connecting said first and second load impedances in series between said control voltage output terminal and a point of reference potential, first rectifying means coupled to said color reference signal generator and to said color synchronizing signal deriving means for developing across said first load impedance a first unidirectional potential proportional to the peak amplitude of the combination of said color synchronizing signal and a first color reference signal output of said generator, second rectifying means coupled to said color reference signal generator and to said color synchronizing signal deriving means for developing across said second load impedance a second unidirectional potential proportional to the peak amplitude of the combination of said color synchronizing signal and a second color reference signal output of said generator substantially differing in phase from said first color reference signal output, and means coupled to said control voltage output terminal for developing a control effect in accordance with the control voltage developed at said terminal, said control voltage comprising the algebraic sum of said first and second unidirectional potentials.

20. In a color television receiver including a local color reference signal generator and means for deriving from received color television signals a color synchronizing signal comprising periodic bursts of oscillations of reference frequency and phase, apparatus comprising the combination of means coupled to said generator for deriving from said generator first and second color reference signal outputs substantially different in phase and appearing at respective first and second color reference signal output terminals, a first load impedance, a second load impedance, a control voltage output terminal, means for connecting said first and second load impedances in series between said control voltage output terminal and a point of reference potential, first rectifying means coupled to said first color reference signal output terminal and to said color synchronizing signal deriving means for developing across said first load impedance a first unidirectional potential proportional to the peak amplitude of the combination of said color synchronizing signal and said first color reference signal output, second rectifying means coupled to said second color reference signal output terminal and to said color synchronizing signal deriving means for developing across said second load impedance a second unidirectional potential proportional to the peak amplitude of the combination of said color synchronizing signal and said second color reference signal output, and means coupled to said control voltage output terminal for developing a control effect in accordance with the control voltage developed at said terminal, said control voltage comprising the algebraic sum of said first and second unidirectional potentials.

21. In a signalling system including a source of synchronizing signals, and a source of oscillations to be synchronized with said synchronizing signals, apparatus comprising the combination of means coupled to said source of oscillations for deriving from said oscillation source first and second oscillation outputs substantially differing in phase and appearing at respective first and second oscillation output terminals, a first load impedance, a second load impedance, a control voltage output terminal, means for connecting said first and second load impedances in series between said control voltage output terminal and a point of reference potential, first rectifying means coupled to said first oscillation output terminal and to said synchronizing signal source for developing across said first load impedance a first unidirectional potential proportional to the peak amplitude of the combination of said synchronizing signal and said first oscillation output, second rectifying means coupled to said second oscillation output terminal and to said synchronizing signal source for developing across said second load impedance a second unidirectional potential proportional to the peak amplitude of the combination of said synchronizing signal and said second oscillation output, and means coupled to said source and to said control voltage output terminal for controlling said oscillation source in phase in accordance with the control voltage developed at said terminal and comprising the algebraic sum of said first and second unidirectional potentials.

References Cited in the file of this patent

UNITED STATES PATENTS

| | | |
|---|---|---|
| 2,318,197 | Clark | May 4, 1943 |
| 2,644,030 | Moore | June 30, 1953 |
| 2,680,147 | Rhodes | June 1, 1954 |
| 2,713,607 | Rhodes | July 19, 1955 |
| 2,715,155 | Bryan | Aug. 9, 1955 |
| 2,754,356 | Espenlaub | July 10, 1956 |

OTHER REFERENCES

RCA, Color Television Receiver, Model CT-100, March 1954, Figure 47, Circuit Diagram.